United States Patent [19]
Kawaura et al.

[11] Patent Number: 5,980,659
[45] Date of Patent: Nov. 9, 1999

[54] SURFACE-TREATED METALLIC PART AND PROCESSING METHOD THEREOF

[75] Inventors: Hiroyuki Kawaura; Hiroshi Kawahara; Kazuaki Nishino; Takashi Saito, all of Aichi, Japan

[73] Assignee: Kabushiki Kaisha Toyota Chuo Kenkyusho, Aichi-ken, Japan

[21] Appl. No.: 08/893,181

[22] Filed: Jul. 15, 1997

[30] Foreign Application Priority Data

Jul. 15, 1996 [JP] Japan ..................................... 8-205319
Aug. 30, 1996 [JP] Japan ..................................... 8-248672

[51] Int. Cl.$^6$ ...................................................... B05D 1/12
[52] U.S. Cl. ......................... 148/535; 148/537; 148/669; 427/190; 427/191
[58] Field of Search ..................................... 148/512, 522, 148/535, 537, 669; 427/190, 191

[56] References Cited

U.S. PATENT DOCUMENTS

| | | | |
|---|---|---|---|
| 4,178,193 | 12/1979 | Kanter | 427/191 |
| 4,902,359 | 2/1990 | Takeuchi et al. | 148/512 |
| 5,413,642 | 5/1995 | Alger | 148/537 |

FOREIGN PATENT DOCUMENTS

| | | |
|---|---|---|
| 5-78817 | 3/1993 | Japan . |
| 5-86443 | 4/1993 | Japan . |
| 8-41654 | 2/1996 | Japan . |

*Primary Examiner*—George Wyszomierski
*Attorney, Agent, or Firm*—Oblon, Spivak, McClelland, Maier & Neustadt, P.C.

[57] ABSTRACT

Surface-treating metallic parts are produced by applying mechanical energy to the surface of a metallic part and to a substance on or near the surface of the metallic part. The substance is different from the metallic part in composition. The applying step forms a mechanically-alloyed layer from the metallic part and the substance in the surface of the metallic part. The surface-modified layer such as the mechanically-alloyed layer is a non-peeling alloyed layer having a composition or structure different from that of the metallic part. The method is effective in surface-treating light metal materials of which the surfaces are difficult to treat. For example, the method is applicable to soft Mg alloys and Al alloys to improve their surface hardness, and the thus-treated alloys are usable in slide parts which are required to have good wear resistance. It is also applicable to the improvement in the oxidation resistance of Ti alloy parts which are used at high temperatures, and to the improvement in the corrosion resistance of Mg alloys which are said to have poor corrosion resistance.

17 Claims, 8 Drawing Sheets

SURFACE-TREATED METALLIC PART AND PROCESSING METHOD THEREOF

BACKGROUND OF THE INVENTION

1. Field of the Invention

The present invention relates to a surface-treated metallic part and a processing method thereof.

2. Description of the Related Arts

For improving the fatigue strength, the corrosion resistance and the wear resistance of metallic materials, various surface treatment techniques have heretofore been proposed. One of those is an alloying process. For this surface treatment technique, known are a surface treatment method comprising applying high energy of arcs, beams or the like to the surface of a substrate to remelt it, thereby forming thereon a surface-modified layer, of which the composition and characteristics are different from those of the substrate, through the reaction of the substrate and the additive added thereto while having a composition different from that of the substrate; and an ion implantation method comprising applying, to a solid substrate, ionized beams of particles that are desired to be implanted at an accelerated ionization rate, thereby implanting the particles into the substrate.

The former method of remelting the surface of the substrate followed by alloying it is advantageous in that the method gives a thick, surface-modified layer, that the adhesion between the layer and the substrate is strong, and that the method is applicable even to partial treatment of the substrate. On the contrary, however, this method is unfavorable in that the thermal influence on the substrate is great so that the substrate is often deformed due to the contractile stress to be caused by the melt bonding between the substrate and the surface-modified layer formed thereon.

On the other hand, the ion implantation method is advantageous in that additive elements can be implanted into the substrate at low temperatures without melting the substrate, that there is no limitation on the combination of the substrate and the ions to be implanted thereinto, that the treatment causes little dimensional change, and that no peeling occurs since the treatment is a non-coating one. However, this method is unfavorable in that it requires expensive apparatus for ionizing the additive element to give ionized beams, that the processing cost is high and that the mass-productivity of the method is poor.

Another simple surface treatment method is known, which comprises plastic working of a substrate to produce residual (compression) stress in its surface area. For example, Japanese Patent Application Laid-Open No. 62-278224 discloses a shot peening technique to make a substrate have residual (compression) stress, and this technique is considered to be extremely effective in improving the fatigue strength of substrates and has been put to practical use. Even in this method, however, it is still impossible to make substrates have satisfactory wear resistance and corrosion resistance.

In order to solve these problems, Japanese Patent Application Laid-Open No. 5-86443 has proposed "a method of surface treatment of aluminium alloy-based parts" comprising shot-peening the surface area of an aluminium alloy-based part, which is characterized in that a peening shot is applied onto the surface of the aluminium alloy-based part while being accompanied by fine-grain particles, whereby the fine-grain particles are embedded into the surface area of the aluminium alloy-based part while being dispersed therein.

They say that, according to the proposed method, the fine-grain particles having the ability to improve the strength reliability of the aluminium alloy-based part, including its wear resistance and corrosion resistance, can be embedded into the surface area of the part through the shot peening treatment with the fine-grain particles, whereby the strength reliability of the thus-treated, aluminium alloy-based part, including its wear resistance and corrosion resistance, can be improved due to the residual stress produced by the shot-peening treatment and due to the existence of the fine-grain particles as embedded in the part.

However, the "method of surface treatment of aluminium alloy-based parts" disclosed in Japanese Patent Application Laid-Open No. 5-86443 has problems of the following points.

(1) Since the bonding between the mechanically-embedded particles and the substrate is weak, the substrate will be cracked and the embedded particles will drop out of the substrate. Therefore, the strength reliability of the thus-treated substrate, including its wear resistance and corrosion resistance, could not be satisfactorily ensured. In order to enlarge the interfacial bonding between the embedded particles and the substrate, the bonding force therebetween must be increased by some secondary treatment.

(2) The degree of improvement in the wear resistance and corrosion resistance of the surface-treated substrate essentially depends on the intrinsic characteristics of the fine-grain particles embedded into the substrate.

(3) Since the particles as mechanically embedded into the substrate exist in its surface while forming a layer constitution comprising a dispersion of the particles, the surface of the substrate is often corroded at its exposed area and therefore could not have satisfactory weather resistance.

SUMMARY OF THE INVENTION

One object of the present invention is to provide a method of surface treatment of metallic parts, which produces, in the surface of the metallic substrate, a non-peeling alloy layer having a composition or structure different alloyed that of the substrate.

Another object of the present invention is to provide surface-treated metallic parts having thereon a non-peeling layer, of which the composition or structure is different from that of the substrate.

The first aspect according to the present invention is a method for surface-treatment of a metallic part. The method comprises the step of applying mechanical energy to the surface of the metallic part and to a substance on or near the surface to form a mechanically alloyed layer by the interaction between the metallic part and the substance on the surface, and the substance is different from the metallic part in composition.

The surface treatment method of the present invention produces, in the surface of a metallic part, a non-peeling, surface-modified layer, of which the composition or structure is different from that of the substrate. The method of the present invention to produce the surface-modified layer is simple and inexpensive.

The second aspect according to the present invention is a method for surface-treatment of a TiAl-based alloy substrate. The method comprises the step of applying mechanical energy to the surface of the TiAl-based alloy substrate and to a substance on or near the surface to form a mechanically-alloyed layer having excellent oxidation resistance on the surface, the substrate comprises a TiAl-based alloy with an Al content of from 15 at. % to 55 at. %, and the substance comprises an oxide or a material to become an oxide having a smaller absolute value of standard free energy of formation than that of alumina.

In the surface treatment method of the present invention, mechanical energy is applied to the surface area of a TiAl-based alloy substrate comprising a TiAl-based alloy with an Al content of from 15 at. % to 55 at. %, while making an additive substance that comprises an oxide having a smaller absolute value of standard free energy of formation than that of alumina exist on the surface area of the substrate. As a result, the surface of the TiAl-based alloy substrate undergoes the impact compression with the additive substance, whereby an oxide layer consisting essentially of the elements constituting the additive substance is formed in the surface of the substrate. Since this oxide has a smaller absolute value of standard free energy formation than that of alumina, it is reduced with aluminium existing in the substrate to be converted into a free metal. On the other hand, aluminium existing in the substrate is oxidized to give an alumina film in the surface of the substrate.

Accordingly, it is believed that such an oxide film having excellent oxidation resistance is formed in the surface area of the TiAl-based alloy substrate. Therefore, according to the surface treatment method of the present invention, such a surface-modified layer can be formed easily and inexpensively in the surface of the substrate.

The third aspect according to the present invention is a surface-treated metallic part comprising a metallic substrate and a surface-modified layer formed in the surface of the substrate, and the surface-modified layer is a mechanically-alloyed layer produced by applying mechanical energy to the surface of the metallic substrate and to a substance on or near the surface of the substrate, and the substance has a composition different from that of the metallic substrate.

The surface-treated metallic part of the invention has, in its surface, a non-peeling modified layer, of which the composition or structure is different from that of the substrate. This surface-treated metallic part of the invention is not produced through adhesion or mechanical embedding of any additive substance onto or into the surface of the metallic substrate, but is produced as a result of the atomic level reaction between the metallic substrate and an additive substance applied onto its surface through the mechanical alloying therebetween. Therefore, in this, the bonding force between the substrate and the mechanically-alloyed layer formed in its surface is large, and the alloyed layer is not peeled from the surface of the substrate. For these reasons, the surface-treated metallic part of the present invention shall have high strength reliability.

The fourth aspect according to the present invention is a surface-treated TiAl-based alloy comprising a TiAl-based alloy substrate and a surface-modified layer formed in the surface of the substrate, the substrate comprises a TiAl-based alloy with an Al content of from 15 at. % to 55 at. % with respect to the whole substrate, and the surface-modified layer is a mechanically-alloyed layer produced by applying mechanical energy to the surface of the substrate and to a substance on or near the surface area of the substrate, and the substance comprises an oxide or a material to become an oxide having a smaller absolute value of standard free energy of formation than that of alumina.

In the surface treatment, mechanical energy is applied to the surface area of a TiAl-based alloy substrate comprising a TiAl-based alloy with an Al content of from 15 at. % to 55 at. %, while making at least one of silicon (Si), niobium (Nb), tantalum (Ta), chromium (Cr), molybdenum (Mo) and tungsten (W) exist on the surface area of the substrate. As a result, a layer of fine-grain particles of the product resulting from the reaction between the additive substance comprising at least one of the elements and the substrate is formed in the surface of the TiAl-based alloy. In this, the additive substance may be composed of only the metal elements, but is preferably in the form of a thermally-stable oxide, or may be converted into such an oxide. Accordingly, an oxide coat film consisting essentially of the elements constituting the additive substance (at least one of Si, Nb, Ta, Cr, Mo and W) is formed in the surface area of the TiAl-based alloy substrate. This oxide coat film is converted into a stable oxide in high-temperature oxidizing atmospheres to thereby give a layer having excellent oxidation resistance at high temperatures. As a result of this surface treatment, therefore, obtained are TiAl-based alloys having excellent oxidation resistance.

For the reasons mentioned hereinabove, it is considered that the surface treatment method of the present invention is simple and inexpensive to produce TiAl-based alloys having excellent oxidation resistance.

BRIEF DESCRIPTION OF THE DRAWINGS

FIG. 2A is a chart of the additive substance, Fe; FIG. 2B is a chart of the substrate, Al; and FIG. 2C is a chart of the surface-modified layer formed on the substrate.

DETAILED DESCRIPTION OF THE INVENTION

Figure 1:
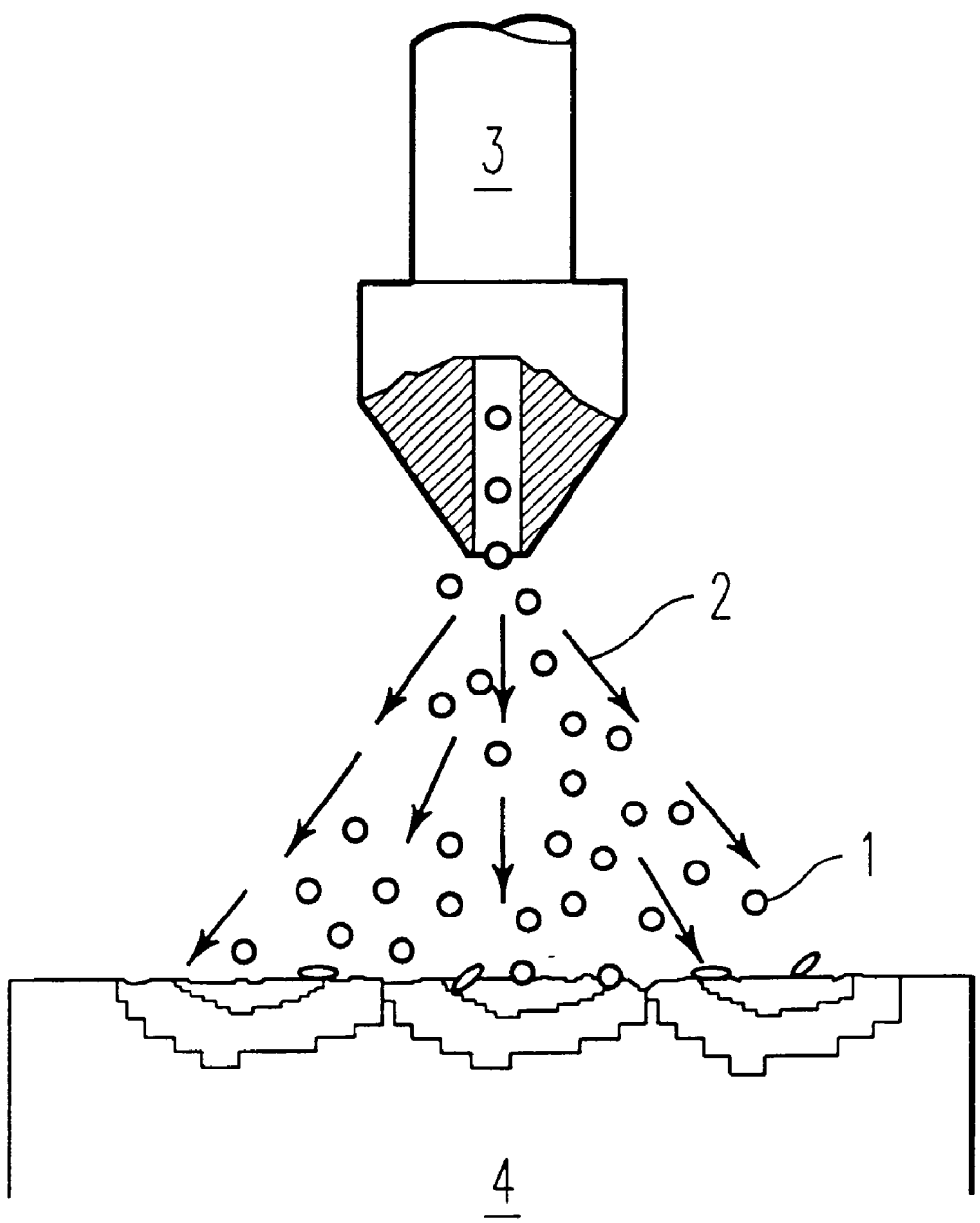
FIG. 1 is a graphical view illustrating the surface treatment method employed in Example 1.

The present inventors have specifically noted the following matters in relation to the above-mentioned problems in the prior art. Surface treatment of a metallic part must be simple and inexpensive. The treatment must not involve remelting of the surface of the metallic part in order to minimize the thermal influence on the part, while forming, in the surface of the metallic part, a non-peeling modified layer having a composition or structure different from that of the metallic part. For achieving a method capable of satisfying these requirements, the present inventors have investigated the means of producing mechanical alloying (MA) with a solid phase reaction in the surface of a metallic part, without elevating the temperature of the metallic part.

The method of the present invention for surface-treating metallic parts comprises applying mechanical energy onto the surface of a metallic part while making a substance having a composition different from that of the metallic part exist on the surface of the metallic part, thereby forming a mechanically-alloyed layer from the metallic part and the substance on the surface of the metallic part.

Though as yet not completely clarified, the mechanism of the surface treatment method of the present invention to produce good results may be considered as follows:

In the surface treatment method of the invention, mechanical energy is repeatedly applied onto the surface of a metallic part in the presence of a substance existing on the surface of the metallic part to thereby form a modified layer in the surface of the metallic part, and the substance is necessary for constituting the modified layer but its composition is different from the composition of the metallic part. Accordingly, in this surface treatment, the surface of the metallic part shall undergo plastic deformation thereby resulting in the formation of a clean surface capable of readily accepting solid deposition thereon. At the same time, in addition, the additive substance existing on the surface of the metallic part is also processed to have a clean surface capable of readily accepting solid deposition thereon while it is ground into fine-grain particles or thin flakes. Further, the repeated application of mechanical energy to the surface of the metallic part having thereon the additive substance involves repeated shearing and friction between the two, the metallic part and the additive substance, to thereby promote the grinding and mixing of the additive substance while also promoting the atomic level admixture of the metallic part and the additive substance at their surfaces. In the atomic level mixing condition, the reaction of the two, the metallic part and the additive substance is effected even at a low temperature. Therefore, in this condition, when the phase formation between the two is more stable than the mere mixing therebetween, relative to the energy applied to the two, the alloying of the two is promoted even at a low temperature. Even for phases having a high energy order, a non-equilibrium phase or a meta-stable phase can be formed through the reaction of the two, the metallic part and the additive substance, as a result of repeated application of mechanical energy thereto that induces the accumulation of internal energy in the inside area of the metallic part.

In view of this mechanism of forming the mechanically-alloyed layer, any high-temperature plastic deformation of the surface of the metallic part is unfavorable, since it interferes with the accumulation of internal energy in the inside area of the metallic part, and the atomic diffusion is promoted to give a stable phase, thereby interfering with the formation of the intended non-equilibrium phase or meta-stable phase. For these reasons, it is desirable that, in the surface treatment method of the present invention, the metallic part is surface-treated while controlling the surface temperature of the metallic part to be not higher than its recrystallization temperature.

As a result of this mechanism, a non-peeling modified layer may be formed in the surface of the metallic part as surface-treated according to the method of the present invention, and the surface-modified layer has a composition or structure which is different from that of the substrate. Therefore, the surface treatment method of the invention is simple and inexpensive to form such a modified layer in the surface of a metallic part.

A prior art technique is known, which is to apply mechanical energy onto a metallic part, thereby making its surface have residual strain or embedding particles into its surface. In this, however, any mechanical alloying could not be attained at the energy level employed. This can be understood with ease from the fact that no alloy phase is formed in the initial stage of a process of deforming particles in which powders are merely admixed while imparting mechanical energy thereto or in any rough mixture as prepared by merely mechanically mixing powders, for example, as reported by Fujita, Nonoyama and Danno in "KINZOKU" 65 (1995), 1143.

Metallic Parts:

The metallic part to which the present invention is applied is not specifically defined, and any and every metallic part can be surface-treated according to the present invention while receiving benefit from the surface treatment. The method of the present invention comprises the mechanical alloying to occur between a metallic part and an additive substance that shall exist on the surface of the part, followed by the plastic deformation of the surface of the metallic part. Therefore, in this method, where the elastic limit of the metallic part to be surface-treated is high, the energy to be imparted to the part in order to induce the plastic deformation of the part must be high. In this case, there should be some limitations on the means of imparting the mechanical energy and also on the conditions for the impartation. Therefore, the mechanical parts to be surface-treated according to the method of the invention are preferably those having a low elastic limit, such as Al-based alloy parts, Mg-based alloy parts, Zn-based alloy parts or Ti-based alloy parts, since the latitude in selecting the means of imparting mechanical energy thereto is broad.

Additive Substances:

The additive substance to be on the surface of a metallic part which is surface-treated according to the present invention has a composition different from that of the metallic part, and comprises the component necessary for forming the surface-modified layer to be formed on the metallic part. Preferably, the additive substance is one which can readily react with the component constituting the metallic part. For example, when the metallic part to be surface-treated is an Al-based alloy, the additive substance may be at least one transition metal, such as Ti, Ni and Fe, or may be a material comprising any one or more of them. To form the surface-modified layer of an amorphous phase or a compound phase, it is desirable that the mixing enthalpy (.H) between the component constituting the additive substance and that constituting the metallic part is negative and its absolute value is large.

Modes of Supplying Additive Substance to Metallic Part:

The additive substance may be in any form of powder or filmy solid, or may also be gaseous or liquid. One or more such types of the additive substance may be supplied to the metallic part.

For the powdery additive substance, its particle size is preferably between 0.1 $\mu$m and 1000 $\mu$m, and more preferably not larger than 300 $\mu$m. If a powdery additive substance having a particle size larger than 300 $\mu$m is used, the mechanical energy applied is absorbed by the additive substance so that a plastic flow may be difficult to occur between the metallic part and the additive substance. It is desirable that the particles of the powdery additive substance are smaller and that the number of the particles is larger, since the contact area between the additive substance and the metallic part can be larger in the presence of the mechanical energy applied thereto, thereby promoting the alloying between the two. Therefore, it is preferable that the particle size of the powdery additive substance is not larger than 100 $\mu$m.

For the filmy additive substance, its thickness is preferably between 0.1 $\mu$m and 1000 $\mu$m. If a filmy additive substance having a thickness larger than 1000 $\mu$m is used, the mechanical energy applied is absorbed by the additive substance layer so that the plastic deformation of the metallic part is difficult to occur. The thickness of the filmy additive substance is more preferably not larger than 10 µm.

To form a film of the additive substance in the surface of the metallic part, employable is any surface treatment of spraying, plating, CVD, etc.

For the gaseous or liquid additive substance, its form is not specifically defined since its deformation resistance is small.

Modes of Imparting Mechanical Energy to Metallic Part:

The mechanical energy to be imparted to the metallic part must be such that it can produce the plastic flow between the surface of the metallic part and the additive substance capable of mechanical alloying therebetween. In order to efficiently produce the plastic flow, it is desirable to reduce the unit area of the surface of the metallic part that receives shearing stress, and to increase the repetitions of the stress. Preferably, the unit area to which the stress is imparted is not larger than 0.5 mm$^2$, and the number of repetitions of the stress is not smaller than 50 cycles, more preferably not smaller than 100 cycles. As specific examples of the means of imparting mechanical energy to the metallic part, mentioned are a method of producing repeated collision of particles at a high speed, against the surface of the metallic part; a method of rotating a container containing the metallic part, the additive substance to be alloyed with the metallic part, and hard balls; and a method of repeatedly peening the surface of the metallic part having thereon the additive substance with a hard brush or the like.

In the first method where particles are made to repeatedly collide against the surface of the metallic part to thereby impart mechanical energy to the surface, particles of the additive powder to be alloyed with the metallic part may be dashed against the metallic part. In this case, it is desirable that the hardness of the particles is comparable to or higher than that of the metallic part. This is because, if the hardness of the particles is lower than that of the metallic part, the particles could only adhere onto the surface of the metallic part while being merely deformed, and fail in producing the plastic flow necessary for the mechanical alloying between the additive substance and the metallic part.

If the hardness of the powdery additive substance is lower than that of the metallic part, employable is a method of previously roughening the surface of the metallic part, then dashing the particles of the powdery additive substance against the thus-roughened surface to thereby make the particles adhered onto the surface, and thereafter imparting mechanical energy to the surface.

The additive substance, if it is gaseous or liquid, may be used as a medium to transport the energy-imparting particles. For example, for the gaseous additive substance, it may be used in the shot-peening of the metallic part in place of compressed air. For the liquid additive substance, it may be sprayed over the metallic part along with energy-imparting particles.

The capacity of the mechanical energy to be imparted to the metallic part varies, depending on the material of the metallic part. In order to attain the intended plastic deformation of the metallic part, it is desirable that the mechanical energy imparted to the metallic part can produce shearing stress that is higher than the 0.2% yield point of the metallic part by at least 50% or more. In the method of the present invention, it is indispensable to apply repeated shearing stress to the metallic part in order to promote the solid phase reaction between the metallic part and the alloying additive substance.

A prior art technique of shot peening is known, which is to make the surface of a shot-peened material have residual stress or to mechanically embed particles into a shot-peened material. In this prior art technique, however, peening balls are shot at the material at most for only a few seconds or so per cm$^2$ of the material. In such a degree of the energy needed in this prior art technique, no mechanical alloying could occur at all in the surface of the material. This prior art technique does not suggest at all the technical idea of the present invention which indispensably produces the mechanically-alloyed phase between the metallic part and the additive substance. Quite contrary to the object of the prior art technique, the surface treatment method of the present invention produces a surface condition that is different from the surface condition that is intended to be produced by the prior art technique, and therefore, the method of the present invention cannot attain the object of the prior art technique.

In one preferred embodiment of promoting the formation of the mechanically-alloyed layer according to the method of the present invention, the metallic part to be surface-treated may be heated at a temperature higher than room temperature but not higher than its recrystallization temperature while mechanical energy is applied thereto. The heating of the metallic part not only facilitates the plastic flow of the surface of the metallic part as reducing the deformation resistance of the surface but also reduces the mechanical energy necessary for producing the intended mechanical alloying. For this purpose, the metallic part may be wholly heated, or alternatively, only the surface of the metallic part may be heated while it is alloyed.

If, however, the metallic part is heated at a temperature higher than its recrystallization temperature, the heating produces undesirable plastic deformation of the metallic part thereby interfering the accumulation of internal energy in the inside area of the metallic part, and, in addition, the atomic diffusion is promoted to give a stable phase, thereby interfering with the formation of the intended non-equilibrium phase or meta-stable phase. Accordingly, it is desirable that the metallic part is heated at a temperature not higher than its recrystallization temperature.

The mechanical alloying reaction attained in the method of the present invention produces a composite, mechanically-alloyed layer which comprises particles having a composition or structure different from that of the layer. In one embodiment, the metallic part to be surface-treated is combined with an additive substance which has an elemental composition different from that of the metallic part and which can form an intermetallic compound with the metallic part. For example, where the metallic part is an Al-based alloy, the additive substance to be combined with it may be Ti, Ni, Fe or the like.

In the surface treatment method of the present invention, the additive substance to be used is not specifically defined but may be any one capable of being selected in accordance with the object of the surface treatment. For its form, the additive substance may be powdery or filmy, and may also be gaseous or liquid. Any desired combination of the metallic part to be surface-treated and the additive substance to be applied thereto can be employed herein. In addition, the latitude in the process of imparting mechanical energy to the metallic part for forming an alloy layer in its surface is broad and the process can be realized relatively simply. Therefore, the method of the invention is inexpensive to produce the intended modified layer in the surface of a metallic part.

In addition, since the method of the present invention is such that the intended alloy layer is formed mechanically between the metallic part and the additive substance without melting the metallic part, it is advantageous in that its thermal influence on the metallic part being processed is small.

The present invention is applicable to the surface treatment of light metal materials for which a few effective surface-treating means are known. For example, the present invention is applicable to slide parts that are required to have wear resistance, as being effective in improving the surface hardness of soft Mg alloys and Al alloys; it is applicable to Ti alloy parts which are used at high temperatures, for improving their oxidation resistance and it is applicable to Mg alloys which are said to have poor corrosion resistance for improving their corrosion resistance.

The surface-treated metallic part of the invention having a surface-modified layer in its surface comprises a metallic substrate and a surface-modified layer formed in its surface, and is characterized in that the surface-modified layer is a mechanically-alloyed layer as formed by applying mechanical energy to the surface of the metallic substrate while making a substance having a composition different from that of the metallic substrate exist on the surface of the substrate.

Though as yet not completely clarified, the mechanism of the surface-treated metallic part of the present invention of exhibiting good effects may be considered as follows:

The surface-modified layer of the surface-treated metallic part of the present invention is formed through repeated impartation of mechanical energy onto the surface of a metallic substrate in the presence of a substance existing on the surface of the metallic substrate, and the substance is necessary for constituting the surface-modified layer but its composition is different from the composition of the metallic substrate. In the surface-treated metallic part of the invention, the surface-modified layer is a mechanically-alloyed layer which is formed through repeated impartation of mechanical energy to a metallic substrate. The surface-modified layer has a clean surface capable of readily accepting solid deposition thereon and the additive substance also has a clean surface capable of readily accepting solid deposition thereon, thereby producing repeated shearing stress and friction between the two, the metallic substrate and the additive substance, to change the atomic potential energy of the two while promoting the atomic level admixture of the two at their surfaces.

Therefore, it is believed that the surface-modified layer of the surface-treated metallic part of the present invention does not peel from the metallic substrate and has a modified phase having a composition or structure different form that of the substrate. Since the surface-modified layer is formed through the atomic level reaction of mechanical alloying between the metallic substrate and the additive substance but neither through mere adhesion of the additive substance onto the metallic substrate nor through mechanical embedding of the additive substance into the metallic substrate, it is further considered that the bonding force between the surface-modified layer and the metallic substrate is great.

Metallic Substrates:

The metallic substrate to which the present invention is applied is not specifically defined, and any metallic substrate can be employed in the present invention while receiving benefit from the surface treatment thereof.

Since the mechanically-alloyed layer of the surface-treated metallic part of the invention is characterized in that it is formed through repeated plastic deformation of the surface of the metallic part, it is desirable that the metallic substrate for use in the invention has a lower elastic limit because it is preferably surface-treated at a lower degree of energy. Therefore, the metallic substrate for use in the invention is preferably made from a material having a relatively lower elastic limit, such as Al alloys, Mg alloys, Zn alloys, Ti alloys, etc.

Surface-Modified Layers:

The surface-modified layer of the surface-treated metallic part of the present invention is a mechanically-alloyed layer as formed in the surface of a metallic substrate such as that mentioned hereinabove, as a result of the impartation of mechanical energy to the substrate in the presence of an additive substance around the substrate, the additive having a composition that is different from that of the metallic substrate. This surface-modified layer may have a non-equilibrium phase composed of an amorphous phase or a super-saturated solid solution. The surface-modified layer may also be a composite layer comprising a dispersion of particles as formed through mechanical alloying. In this case, the layer may have a constitution comprising a dispersion of nano-level, fine-grain particles. The surface-treated metallic part of the present invention may have the surface-modified layer on a desired part of the surface of the metallic substrate or may have it on the entire surface of the metallic substrate.

One preferred embodiment of the surface-treated metallic part of the present invention has, as the surface-modified layer, a mechanically-alloyed layer of an amorphous phase. The amorphatization of the surface of a metallic substrate results in the compositional homogenization of the surface thereof. Accordingly, the surface-treated metallic part of this preferred embodiment is free from any compositional non-uniformity to be accompanied by grain boundaries, and is therefore prevented from being corroded. Thus, the surface-treated metallic part of that type has high corrosion resistance.

Another preferred embodiment of the surface-treated metallic part of the invention has, as the surface-modified layer, a mechanically-alloyed layer of a super-saturated solid solution. After having been surface-treated to have the surface-modified layer of such a super-saturated solid solution, the metallic part may be annealed under heat to have a hard layer as formed thereon through precipitation of solids from the solid solution.

Still another preferred embodiment of the surface-treated metallic part of the present invention has, as the surface-modified layer, a composite mechanically-alloyed layer comprising a dispersion of particles of which the composition or structure is different from that of the layer. If, for example, the composite layer comprises a dispersion of hard particles of an intermetallic compound, it has wear resistance. If, the composite layer comprises a dispersion of particles of an oxide formed through alloying, it has not only wear resistance but also oxidation resistance owing to the pinning effect of the dispersed oxide particles.

The present invention also provides a method of surface treatment of TiAl-based alloys, which is described hereinunder.

Surface Treatment of TiAl-based Alloys:

The method of the present invention for surface-treating TiAl-based alloys comprises applying mechanical energy onto the surface area of a TiAl-based alloy substrate comprising a TiAl-based alloy with an Al content of from 15 at. % to 55 at. %, while making a substance that comprises an oxide having a smaller absolute value of standard free energy of formation than that of alumina exist on the surface area of the substrate, thereby forming a mechanically-alloyed layer having excellent oxidation resistance in the surface area of the TiAl-based alloy substrate.

TiAl-based alloys thus surface-treated according to the method of the present invention shall have excellent oxidation resistance.

As being more lightweight and having a higher relative strength at high temperatures, TiAl-based alloys are superior to Ni-base superalloys which are the most popular, practicable heat-resistant metallic materials, and are therefore expected to be applicable to various materials which are required to be lightweight and have high heat resistance and high strength, for example, to turbine wheel materials, etc. However, TiAl-based alloys are unfavorable in that their oxidation resistance is greatly lowered at high temperatures of 800° C. or higher, compared with Ni-base superalloys (for example, Inconel 713C). Therefore, in order to use such TiAl-based alloys as heat-resistant materials, the improvement in the oxidation resistance of the alloys is indispensable. For this, addition of ternary elements to the alloys or surface treatment of the alloys is under study.

To improve the oxidation resistance of TiAl-based alloys by the addition of ternary elements thereto, for example, known is a method of adding ternary elements, such as chromium (Cr), molybdenum (Mo), niobium (Nb), silicon (Si), tantalum (Ta), tungsten (W), etc., to TiAl-based alloys. The method brings about the improvement in the oxidation resistance of the alloys. However, this method is unfavorable in that the alloys could not still exhibit satisfactory oxidation resistance in air at high temperatures of 900° C. or higher since their oxidation rate is large under those conditions.

The examples of surface treatment of TiAl-based alloys to improve their oxidation resistance, referred to are (1) aluminizing of the alloys, (3) chromizing of the alloys, (3) treatment of the alloys in low oxygen partial pressure atmospheres, etc. However, these are not always effective in view of the adhesion between the alloy matrix and the film formed thereon and of the long-term stability of the film.

In order to solve these problems, "TiAl-based intermetallic compound materials having excellent oxidation resistance and a method for producing them" (Japanese Patent Application Laid-Open No. 5-78817) have been proposed, which are characterized in that an Mo and/or W-rich layer is formed in the surface of a TiAl-based intermetallic compound material to have a thickness of 0.5 $\mu$m or larger in the direction of its depth, through sputtering combined with diffusion coating or through heating in the presence of Mo and/or W oxides optionally followed by diffusion coating.

However, the TiAl-based intermetallic compound materials disclosed in Japanese Patent Application Laid-Open No. 5-78817 has problems in various points such as those mentioned below. In the TiAl-based intermetallic compound material of that type, many Ti elements exist in the vicinity of its surface. Therefore, the mere formation of such an Mo and/or W-rich layer in its surface could not provide a protective film with satisfactory oxidation resistance. Accordingly, in oxidizing atmospheres in air, not only a protective film of alumina but also $TiO_2$ is formed. $TiO_2$ thus formed grows toward the inside of the substrate, thereby greatly lowering the oxidation resistance of the substrate. For these reasons, it is impossible to form a protective film with satisfactory oxidation resistance on the substrate. In addition, the disclosed technique requires the adhesion of Mo and/or W followed by diffusion coating to be effected at a temperature falling between 700° C. and 1450° C., which, however, will cause sintering and solidification of the metal powders. Such may cause problems of the following. The thus-solidified metal powders will adhere onto the TiAl-based intermetallic compound material. Moreover, when a TiAl-based intermetallic compound material is heated in the presence of Mo and/or W oxides in a closed vessel, the oxides will also be sintered and solidified like the metal powders, causing the same problem in that the thus-solidified oxides will adhere onto the TiAl-based intermetallic compound material. The adhered oxides will react with the TiAl-based intermetallic compound material in oxidizing atmospheres to give products having a low melting point, whereby the oxidation resistance of the material will be rather lowered. In addition, the heat treatment in the closed vessel is unfavorable in point of the producibility.

Japanese Patent Application Laid-Open No. 8-41654 has proposed "a method of surface treatment of TiAl", which comprises casing TiAl in a container while being packed therein together with powdery niobium oxide, followed by keeping the container in a high-temperature atmosphere having a low vacuum to thereby form an alumina film in the surface of TiAl.

However, the "method of surface treatment of TiAl" disclosed in Japanese Patent Application Laid-Open No. 8-41654 has problems of the following points. (1) Since this method requires the heat treatment of TiAl to be effected in vacuum in such a closed container, it has problems of its producibility. (2) This method is further unfavorable in that the processing powder is solidified and sintered and that the powder adheres onto TiAl being treated. Therefore, in this method, the processing powder must be fluidized while being prevented from solidifying, and the powder must be sublimed and vaporized at a temperature not higher than the processing temperature.

Japanese Patent Application Laid-Open No. 5-86443 has proposed "a method of surface treatment of aluminium alloy-based parts" comprising shot-peening the surface area of an aluminium alloy-based part, which is characterized in that a peening shot is applied onto the surface of the aluminium alloy-based part while being accompanied by fine-grain particles, whereby the fine-grain particles are embedded into the surface area of the aluminium alloy-based part while being dispersed therein.

However, the "method of surface treatment of aluminium alloy-based parts" disclosed in Japanese Patent Application Laid-Open No. 5-86443 has problems of the following points. (1) An aluminium alloy-based part has many Ti elements in the vicinity of its surface. Therefore, even if such an aluminium alloy-based part is shot-peened in order to make fine-grain particles, which may be effective in making the part have wear resistance and corrosion resistance, embedded into the surface of the part, $TiO_2$ is readily formed in the surface of the part in high-temperature oxidizing atmospheres, whereby the oxidation resistance of the part is lowered. (2) Even if such fine-grain particles are dispersed in the surface of the aluminium alloy-based part through the shot-peening, and then diffused thereinto, Ti elements still exist in the vicinity of the surface of the part. Therefore, the surface treatment disclosed is still not satisfactorily effective in improving the oxidation resistance and the corrosion resistance of the aluminium alloy-based part. (3) Since the bonding between the mechanically-embedded particles and the substrate is weak, the substrate will be cracked and the embedded particles will drop out of the substrate. Therefore, the strength reliability of the thus-treated substrate, including its wear resistance and corrosion resistance, could not be satisfactorily ensured. In order to enlarge the interfacial bonding between the embedded particles and the substrate, the bonding force therebetween must be increased by any secondary treatment. (4) The degree of improvement in the wear resistance and corrosion resistance of the surface-treated substrate essentially depends on the intrinsic characteristics of the fine-grain particles as embedded into the substrate. (5) Since the particles as mechanically embedded into the substrate exist in its surface while forming a layer constitution comprising a dispersion of the particles, the surface of the substrate is often corroded at its exposed area and therefore could not have satisfactory weather resistance.

The method of the present invention for surface-treating TiAl-based alloys comprises applying mechanical energy onto the surface area of a TiAl-based alloy substrate comprising a TiAl-based alloy with an Al content of from 15 at. % to 55 at. %, while making a substance (additive substance) that comprises an oxide having a smaller absolute value of standard free energy of formation than that of alumina exist on the surface area of the substrate, thereby forming an oxide coat layer having excellent oxidation resistance in the surface area of the TiAl-based alloy substrate.

Though as yet not clarified completely, the mechanism of the method of the invention for surface-treating TiAl-based alloys to produce excellent results may be considered as follows.

In the surface treatment method of the present invention, mechanical energy is applied onto the surface area of a TiAl-based alloy substrate comprising a TiAl-based alloy with an Al content of from 15 at. % to 55 at. %, while making an additive substance that comprises an oxide having a smaller absolute value of standard free energy of formation than that of alumina exist on the surface area of the substrate. As a result, the surface of the TiAl-based alloy substrate undergoes the impact compression with the additive substance, whereby an oxide layer consisting essentially of the elements constituting the additive substance is formed in the surface of the substrate. Since this oxide has a smaller absolute value of standard free energy formation than that of alumina, it is reduced with aluminium existing in the substrate to be converted into a free metal. On the other hand, aluminium existing in the substrate is oxidized to give an alumina film in the surface of the substrate.

Accordingly, it is believed that such an oxide film having excellent oxidation resistance is formed in the surface area of the TiAl-based alloy substrate. Therefore, according to the surface treatment method of the present invention, such a surface-modified layer can be formed easily and inexpensively in the surface of the substrate.

TiAl-based Alloy Substrates:

The TiAl-based alloy substrate to be surface-treated according to the present invention comprises a TiAl-based alloy having an Al content of from 15 at. % to 55 at. %.

As comprising such a TiAl-based alloy having an Al content of from 15 at. % to 55 at. %, the TiAl-based alloy has ductility at room temperature and high-temperature strength. If the Al content of the alloy is smaller than 15 at. %, the alloy will have a mixed texture comprising an α-Ti alloy and a Ti$_3$Al phase, resulting in that its high-temperature strength is lowered. On the other hand, if it is larger than 55 at. %, the alloy will have a mixed texture comprising a TiAl phase and an Al$_3$Ti phase thereby to be extremely brittle.

The TiAl-based alloy for use in the present invention may be any desired one. For example, raw materials are melted or sintered, and thereafter cast, forged, cut and rolled in any desired form.

Additive Substances:

The additive substance to be used in the method of the present invention for surface-treating TiAl-based alloys such as those mentioned hereinabove may be a powdery solid, gaseous or liquid one comprising an oxide having a smaller absolute value of standard free energy of formation than that of alumina. Oxides having a smaller absolute value of standard free energy of formation are more readily oxidized into free metals; while those having a larger absolute value thereof are more stable.

Examples of the oxide for use in the invention include powdery oxides of at least one element of Ti, V, Cr, Mn, Fe, Co, Ni, Cu, Nb, Mo, Ta, W, Si and Ce. Powders comprising such oxides are also usable herein. Oxides having a smaller absolute value of standard free energy of formation than alumina are known, for example, as referred to by J. F. Elliot and M. Gleiser in Thermo-chemistry for Steelmaking, Vol. I (1960), Addison-Wesley.

Preferably, the additive substance for use in the invention is a powdery substance consisting essentially of an oxide of at least one element of Nb, Ta, Cr, Mo, W and Si. This is because the powdery substance of that type readily undergoes oxidation-reduction at high temperatures to give an alumina coat film having excellent oxidation resistance.

The mode of supplying the additive substance to the substrate in the method of the present invention is not specifically defined, and any modes, means and conditions capable of attaining the object of the present invention are employable herein.

According to the present invention, mechanical energy is applied onto the surface area of a TiAl-based alloy substrate such as that mentioned hereinabove, while supplying the additive substance that comprises an oxide having a smaller absolute value of standard free energy of formation than that of alumina, such as that mentioned hereinabove, to the surface area of the substrate, whereby a mechanically-alloyed layer having excellent oxidation resistance is formed in the surface area of the substrate. For this, it is the most desirable to supply the additive substance to the substrate by dashing a powder of the additive substance against the substrate at a high speed.

It is desirable that the substrate is surface-treated in the presence of the additive substance or while supplying the additive substance to the substrate, in an inert gas atmosphere such as Ar or the like, but the surface treatment may be effected in air.

The additive substance may be in the form of an alloy powder, an oxide powder or a composite powder comprising them.

For particles of the additive substance, it is preferable that their size falls between 5 and 300 μm. If their size is smaller than 5 μm, such too small particles are difficult to handle. On the other hand, if larger than 300 μm, the surface reaction of such large particles is difficult to effect.

The additive substance may be supplied to the substrate in air, but preferably in an inert gas atmosphere.

After the additive substance is reacted with the TiAl-based alloy substrate in its surface, it is desirable to heat the substrate. The post heating is effective in further improving the oxidation resistance of the surface-treated substrate. The heating temperature shall be not higher than 1450° C. This is because, if it is higher than 1450° C., the TiAl-based alloy will be melted.

Regarding the energy for supplying the additive substance to the substrate, it is desirable that the additive substance is dashed against the substrate at a jetting speed of from 20 to 300 m/sec. If the jetting speed is lower than 20 m/sec, the surface reaction between the additive substance and the substrate is difficult to effect; but if higher than 300 m/sec, the surface condition of the substrate will be worsened.

Preferred Modes of Surface Treatment of TiAl-based Alloys:

In the present invention, one preferred mode of surface-treating TiAl-based alloys comprises applying mechanical energy to the surface area of a TiAl-based alloy substrate comprising a TiAl-based alloy with an Al content of from 15 at. % to 55 at. %, while making an additive substance comprising at least one element of Si (silicon), niobium (Nb), tantalum (Ta), chromium (Cr), molybdenum (Mo) and tungsten (W) exist on the surface area of the substrate, to thereby form an alloy film having excellent oxidation resistance and consisting essentially of the element constituting the additive substance (at least one of Si, Nb, Ta, Cr, Mo and W) on the surface area of the substrate.

The alloy film thus formed in this mode acts as a protective film, while additionally forming a layered alumina film in a high-temperature oxidizing atmosphere. These films have good adhesion to the substrate matrix, while stably acting as protective films for a long period of time, whereby the oxidation resistance of the thus-treated substrate is greatly improved.

Though as yet not clarified completely, the mechanism of the surface treatment method of this preferred mode to produce good results may be considered as follows:

In the surface treatment method of this mode, mechanical energy is applied to the surface area of a TiAl-based alloy substrate comprising a TiAl-based alloy with an Al content of from 15 at. % to 55 at. %, while making at least one of silicon (Si), niobium (Nb), tantalum (Ta), chromium (Cr), molybdenum (Mo) and tungsten (W) exist on the surface area of the substrate. As a result, a layer of fine-grain particles of the product resulting from the reaction between the additive substance comprising at least one of the elements and the substrate is formed in the surface of the TiAl-based alloy. In this, the additive substance may be composed of only the metal elements, but is preferably in the form of a thermally-stable oxide, or may be converted into such an oxide. Accordingly, an oxide coat film consisting essentially of the elements constituting the additive substance (at least one of Si, Nb, Ta, Cr, Mo and W) is formed in the surface area of the TiAl-based alloy substrate. This oxide coat film is converted into a stable oxide in high-temperature oxidizing atmospheres to thereby give a layer having excellent oxidation resistance at high temperatures. As a result of this surface treatment, therefore, obtained are TiAl-based alloys having excellent oxidation resistance.

For the reasons mentioned hereinabove, it is considered that the surface treatment method of the present invention is simple and inexpensive to produce TiAl-based alloys having excellent oxidation resistance.

Another preferred mode of the method of the present invention for surface-treating TiAl-based alloys comprises applying mechanical energy to the surface area of a TiAl-based alloy substrate comprising a TiAl-based alloy with an Al content of from 15 at. % to 55 at. %, while making an additive substance comprising at least one element of Si (silicon), niobium (Nb), tantalum (Ta), chromium (Cr), molybdenum (Mo) and tungsten (W) exist on the surface area of the substrate, to thereby form an oxide film having excellent oxidation resistance and consisting essentially of the element constituting the additive substance (at least one of Si, Nb, Ta, Cr, Mo and W) in the surface area of the substrate.

The oxide film thus formed in this mode acts as a protective film, while additionally forming a layered alumina film in a high-temperature oxidizing atmosphere. These oxide films have good adhesion to the substrate matrix, while stably acting as protective films for a long period of time, whereby the oxidation resistance of the thus-treated substrate is greatly improved.

More preferably, in these preferred modes, the coat film formed in the surface area of the TiAl-based alloy substrate is in the form of a layer having excellent oxidation resistance and comprising an oxide that is stable in high-temperature oxidizing atmospheres.

The coat film of that type is effective in preventing the internal oxidation of the substrate, while stably acting as a protective film for a long period of time. In this case, therefore, it is easy to obtain TiAl-based alloys with excellent oxidation resistance.

A still further preferred mode of the method of the present invention for surface-treating TiAl-based alloys comprises applying mechanical energy to the surface area of a TiAl-based alloy substrate comprising a TiAl-based alloy with an Al content of from 15 at. % to 55 at. %, while making an additive substance comprising at least one element of niobium (Nb) and tantalum (Ta) exist on the surface area of the substrate, to thereby form an oxide film having excellent oxidation resistance and consisting essentially of the element constituting the additive substance (at least one of Nb and Ta) in the surface area of the substrate.

The oxide film thus formed in this mode is further reacted with the substrate in a high-temperature oxidizing atmosphere to give an additional, stable oxide layer consisting essentially of Al—O, and this stable oxide layer exhibits especially excellent oxidation resistance at high temperatures.

In this mode, since the substrate additionally has the stable, oxidation-resistant layer consisting essentially of Al—O between the substrate and the previously-formed oxide film, the formation of $TiO_2$ that causes the internal oxidation of the substrate is prevented. In this, even if the previously-formed oxide film is lost, the alloy substrate does not lose its high-temperature oxidation resistance.

Still another preferred mode of the method of the present invention for surface-treating TiAl-based alloys comprises applying mechanical energy to the surface area of a TiAl-based alloy substrate comprising a TiAl-based alloy with an Al content of from 15 at. % to 55 at. %, while making an additive substance comprising a chromium (Cr) element exist on the surface area of the substrate, to thereby form an oxide film having excellent oxidation resistance and consisting essentially of the element, Cr, constituting the additive substance on the surface area of the substrate; in which the oxide film further forms an additional, stable oxide layer having excellent oxidation resistance even in high-temperature atmospheres.

In this mode, the oxide film acts as a protective film, while further forming the additional, stable oxide layer having excellent oxidation resistance even in high-temperature atmospheres, and the additional oxide layer also acts as a protective film even at high temperatures.

Preferred TiAl-based Alloy Substrates:

One preferred embodiment of the TiAl-based alloy substrate to be surface-treated according to the method of the present invention is a TiAl-based alloy having an Al content of from 15 to 55 at. % and containing at least one element of the Group Va and/or the Group VIa in an amount of from 0.1 at. % to 10 at. % in total.

As containing at least one element of the Group Va and/or the Group VIa, the substrate has improved ductility and improved high-temperature strength. However, if the content of the elements of the Group Va and/or the Group VIa is more than 10 at. %, the weight of the TiAl-based alloy will unfavorably increases.

Another preferred embodiment of the TiAl-based alloy substrate to be surface-treated according to method of the present invention is a TiAl-based alloy having an Al content of from 15 to 55 at. % and additionally containing from 1 at. % to 10 at. % of boron.

As additionally containing from 1 at. % to 10 at. % of boron, the substrate has a finer solid texture and has more improved ductility at room temperature. However, if the boron content of the substrate is larger than the defined range, the ductility of the substrate at room temperature is lowered.

Still another preferred embodiment of the TiAl-based alloy substrate to be surface-treated according to the method of the present invention is a TiAl-based alloy having an Al content of from 15 to 55 at. %, containing at least one element of the Group Va and/or the Group VIa in an amount of from 0.1 at. % to 10 at. % in total and additionally containing from 1 at. % to 10 at. % of boron.

As containing an element of the Group Va and/or the Group VIa, the substrate has improved ductility and improved high-temperature strength. As additionally containing from 1 at. % to 10 at. % of boron, the substrate has a finer solid texture and has more improved ductility at room temperature.

According to the method of the present invention for surface-treating TiAl-based alloys, it is easy to obtain TiAl-based alloys having excellent oxidation resistance. As a result of the surface treatment of the invention, the oxidation resistance of TiAl-based alloys is much improved and is higher than that of a heat-resistant, Ni-base alloy Inconel 713C. After having been surface-treated according to the invention, TiAl-based alloys shall have good heat resistance even at high temperatures of 900° C. or higher. Therefore, the surface-treated TiAl-based alloys are usable not only as materials for turbo-chargers for cars but also as those for gas turbines for power plants, those for jet engines, etc.

In addition, since the surface treatment method of the present invention does not require any complicated apparatus such as closed containers, etc., and since it does not require any additional heat treatment, the processing powder used neither adhere to the substrate being surface-treated nor is sintered and solidified by itself.

If fine-grain particles of the processing powder are applied to castings of TiAl-based alloys prior to being taken out of a mold, the oxidation resistance of the castings can be improved while they are in the mold.

The present invention provides surface-treated TiAl-based alloys, which will be described in detail hereinunder.
Surface-treated TiAl-based Alloys:

The surface-treated TiAl-based alloy of the present invention has excellent oxidation resistance and comprises a TiAl-based alloy substrate comprising a TiAl-based alloy with an Al content of from 15 at. % to 55 at. %, and a surface-modified layer formed in the surface of the substrate, in which the surface-modified layer is a mechanically-alloyed layer as formed by applying mechanical energy onto the surface area of the TiAl-based alloy substrate while making a substance that comprises an oxide having a smaller absolute value of standard free energy of formation than that of alumina exist on the surface area of the substrate.

In one preferred embodiment of the surface-treated TiAl-based alloy of the invention, which has excellent oxidation resistance and comprises a TiAl-based alloy substrate comprising a TiAl-based alloy with an Al content of from 15 at. % to 55 at. %, and a surface-modified layer formed in the surface of the substrate; the surface-modified layer constitutes the surface area of the substrate and comprises an alloy film as formed by applying mechanical energy onto the surface area of the TiAl-based alloy substrate while making an additive substance that comprises at least one element of silicon (Si), niobium (Nb), tantalum (Ta), chromium (Cr), molybdenum (Mo) and tungsten (W) exist on the surface area of the substrate; the surface area of the TiAl-based alloy substrate comprises an oxide film consisting essentially of the elements that constitute the additive substance (at least one or more of Si, Nb, Ta, Cr, Mo and W); and the oxide film forms a layer comprising a stable oxide in high-temperature oxidizing atmospheres to have excellent oxidation resistance at high temperatures.

As having such a surface-modified layer having excellent oxidation resistance in its surface, the surface-treated TiAl-based alloy of the present invention shall have excellent oxidation resistance.

Though as yet not clarified completely, the mechanism of the surface-treated TiAl-based alloy with such excellent oxidation resistance of the present invention to produce good results may be considered as follows:

The TiAl-based alloy substrate to be surface-treated in the present invention comprises a TiAl-based alloy having an Al content of from 15 at. % to 55 at. %. Therefore, it has, by itself, good ductility at room temperature and good high-temperature strength.

The surface-treated TiAl-based alloy of the present invention has a surface area with excellent oxidation resistance as formed by applying mechanical energy to the substrate of the alloy while making an additive substance comprising at least one element of silicon (Si), niobium (Nb), tantalum (Ta), chromium (Cr), molybdenum (Mo) and tungsten (W) exist on the surface area of the substrate. This surface area of the TiAl-based alloy substrate comprises an oxide film that consists essentially of the elements constituting the additive substance (at least one of Si, Nb, Ta, Cr, Mo and W), and the oxide film acts as a protective film. Therefore, this oxide film inhibits the formation of $TiO_2$ that may grow toward the depth of the substrate, and the oxidation resistance of the surface-treated TiAl-based alloy having the oxide film is greatly improved.

In addition, the oxide film of the TiAl-based alloy of the invention is converted into a stable oxide in high-temperature oxidizing atmospheres to give a layer having excellent oxidation resistance at high temperatures. Precisely, the oxide film consisting essentially of at least one element of silicon (Si), niobium (Nb), tantalum (Ta), chromium (Cr), molybdenum (Mo) and tungsten (W), which is formed in the surface area of the TiAl-based alloy of the invention, is, when exposed to high-temperature oxidizing atmospheres, converted into an oxide film that is stable at high temperatures, thereby acting to improve the oxidation resistance of the alloy.

For the reasons mentioned above, it is believed that the surface-treated TiAl-based alloy of the present invention has excellent oxidation resistance.

Preferred Embodiments of Surface-treated TiAl-based Alloys:

One preferred embodiment of the surface-treated TiAl-based alloy of the present invention comprises a TiAl-based alloy substrate comprising a TiAl-based alloy with an Al content of from 15 at. % to 55 at. %, and a surface area of the substrate having excellent oxidation resistance, which is formed by applying mechanical energy onto the surface of the substrate while making an additive substance comprising at least one element of niobium (Nb) and tantalum (Ta) exist on the surface. This embodiment is characterized in that the surface area of the substrate comprises an oxide film consisting essentially of the element that constitutes the additive substance (at least one of Nb and Ta), and forms, after having been reacted with the substrate in a high-temperature oxidizing atmosphere, a stable oxide layer consisting essentially of Al—O between the substrate and the oxide film, and that the stable oxide layer has excellent oxidation resistance at high temperatures.

In this embodiment, even if the oxide film loses its protecting activity in high-temperature oxidizing atmospheres, the stable oxide layer consisting essentially of Al—O still exhibits its protecting activity. In addition, in this, the stable oxide layer has good adhesion to the substrate. Accordingly, the surface-treated TiAl-based alloy of this embodiment has excellent oxidation resistance.

Another embodiment of the surface-treated TiAl-based alloy of the present invention comprises a TiAl-based alloy substrate comprising a TiAl-based alloy with an Al content of from 15 at. % to 55 at. %, and a surface area of the substrate having excellent oxidation resistance, which is formed by applying mechanical energy onto the surface of the substrate while making an additive substance comprising chromium (Cr) exist on the surface. This embodiment is characterized in that the surface area of the substrate comprises an oxide film consisting essentially of the element, Cr, that constitute the additive substance, and forms, after having been reacted with the substrate in a high-temperature oxidizing atmosphere, a stable oxide layer having excellent oxidation resistance.

In this embodiment, the oxide film acts as a protective film, and forms such a stable oxide layer having excellent oxidation resistance in high-temperature oxidizing atmospheres, and the thus-formed stable oxide layer also acts as a protective film. Accordingly, the surface-treated TiAl-based alloy of this embodiment has excellent oxidation resistance.

Still another preferred embodiment of the surface-treated TiAl-based alloy of the present invention comprises a TiAl-based alloy substrate comprising a TiAl-based alloy with an Al content of from 15 at. % to 55 at. %, and a surface-modified layer formed in the surface of the substrate, in which the surface-modified layer is a mechanically-alloyed layer as formed by applying a substance comprising at least one element of silicon (Si), niobium (Nb), tantalum (Ta), chromium (Cr), molybdenum (Mo) and tungsten (W) to the surface of the substrate.

TiAl-based Alloy Substrates:

Regarding the TiAl-based alloy substrate constituting the surface-modified TiAl-based alloy of the invention and the embodiments of the substrate, referred to are those mentioned hereinabove for the method of surface-treating TiAl-based alloys of the invention.

The present invention will be described in more detail with reference to the following Examples.

EXAMPLE 1

This is to demonstrate the method of the present invention of surface-treating a pure aluminium substrate to form a layer of a dispersion of AlFe compounds in the surface area of Al.

To apply mechanical energy to the substrate, employed herein was a method of repeatedly dashing particles comprising an additive substance against the surface of the metal substrate at a high speed. Concretely, employed herein was a shot-peening device as in FIG. 1, in which the particles 1 were jetted through the nozzle 3 along with compressed air 2, and repeatedly dashed against the surface of the aluminium part 4. The distance between the top of the nozzle and the substrate was 100 mm. The area to be treated was 5 cm$^2$. As the Fe source necessary for forming the compound, used herein was a pure iron powder having a particle size of approximately from 30 to 150 $\mu$m and a purity of 99.99%. The iron powder was jetted out through the nozzle along with compressed air at a pressure of 6 kgf/cm$^2$, whereby the iron particles were repeatedly dashed against the surface of the substrate for 5 minutes. The collision of the particles against the substrate gave mechanical energy to the substrate. Next, in order to further mechanically knead the additive, iron and the substrate, aluminium, iron particles having a particle size of 400 $\mu$m were jetted out through the nozzle along with compressed air under a pressure of 3 kgf/cm$^2$ for 1 minute. Thus was completed the surface modification of the aluminium substrate according to the method of the invention.

COMPARATIVE EXAMPLE 1

For comparison, the same substrate having the same shape as above was processed according to a prior art technique of producing residual stress in the surface of the substrate, in which steel particles having a particle size of 400 $\mu$m were jetted out through the nozzle along with compressed air at a pressure of 6 kgf/cm$^2$ for 15 seconds. The thus-treated sample was referred to as Sample C1.

COMPARATIVE EXAMPLE 2

Also for comparison, a mixture of steel particles with a particle size of 400 $\mu$m as mixed with about 10% of fine-grain particles of Fe having a particle size of about 10 $\mu$m was jetted out through the nozzle along with compressed air at a pressure of 6 kgf/cm$^2$ for 15 seconds. This process is to mechanically embed the particles into the substrate. The thus-treated sample was referred to as Sample C2.

Figure 2A:
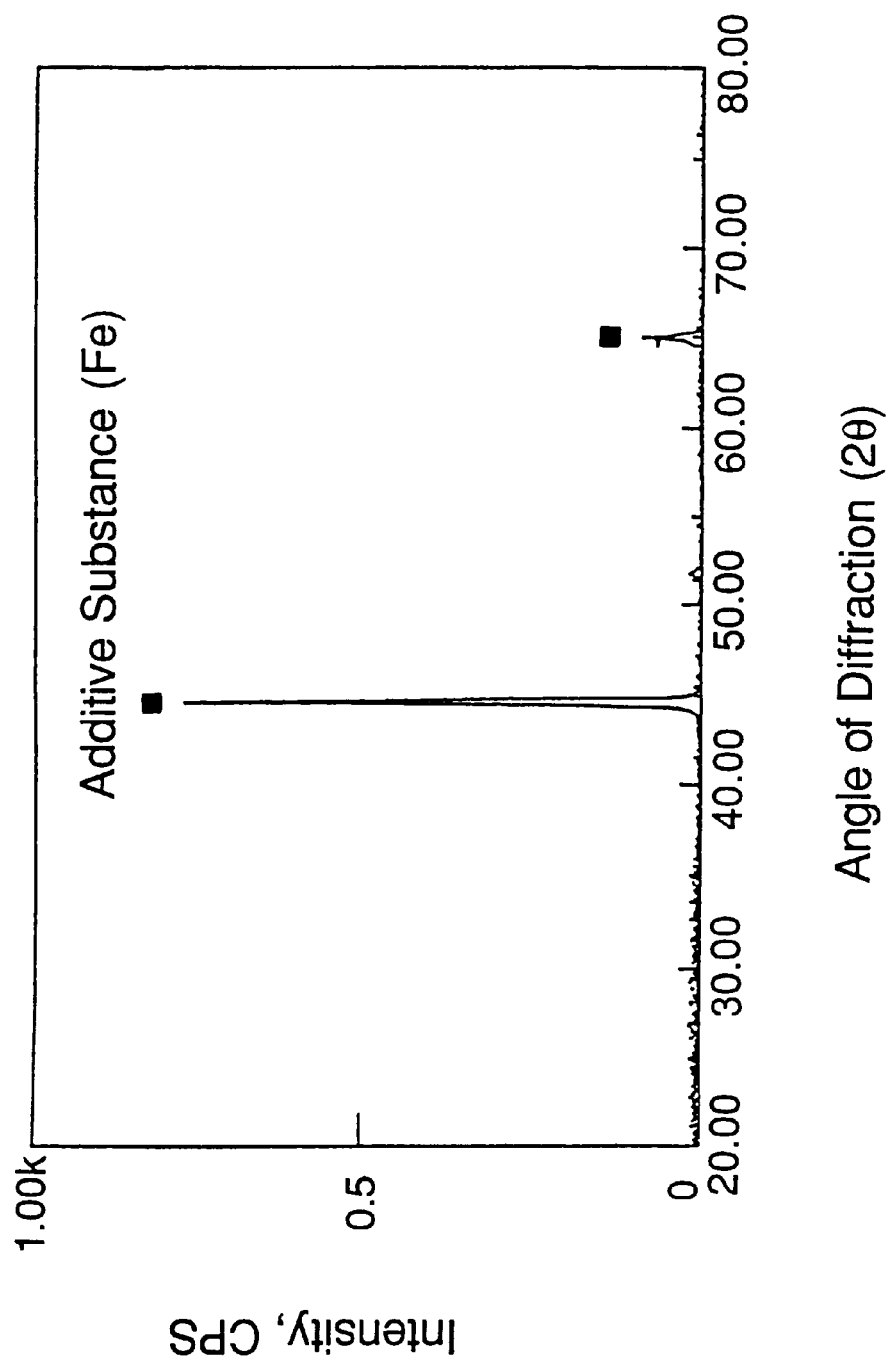
FIGS. 2A, 2B, and 2C are charts in X-ray diffractometry of the surface-treated metallic part obtained in Example 1. Precisely.
Figure 2B:
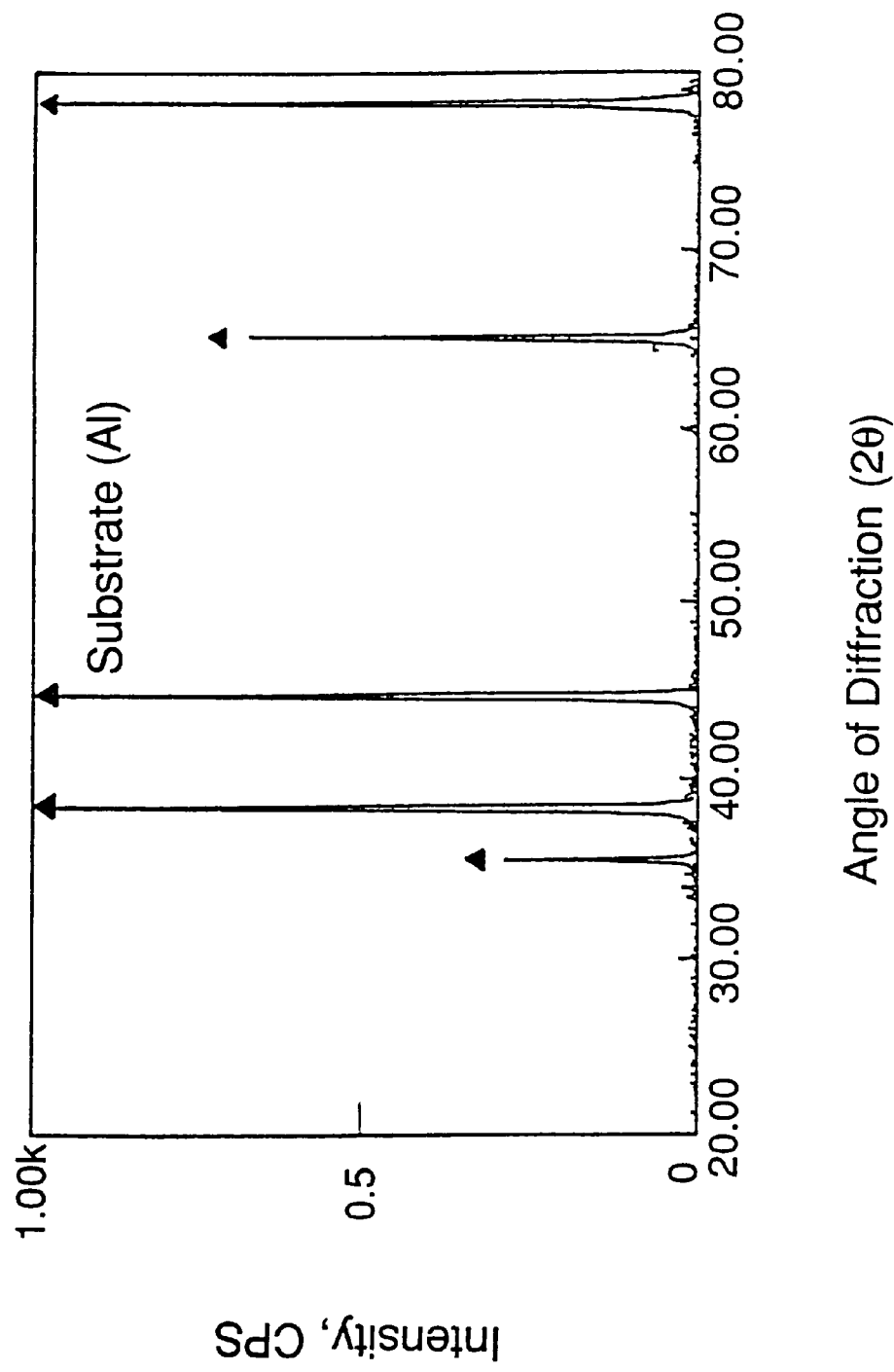
Figure 2C:
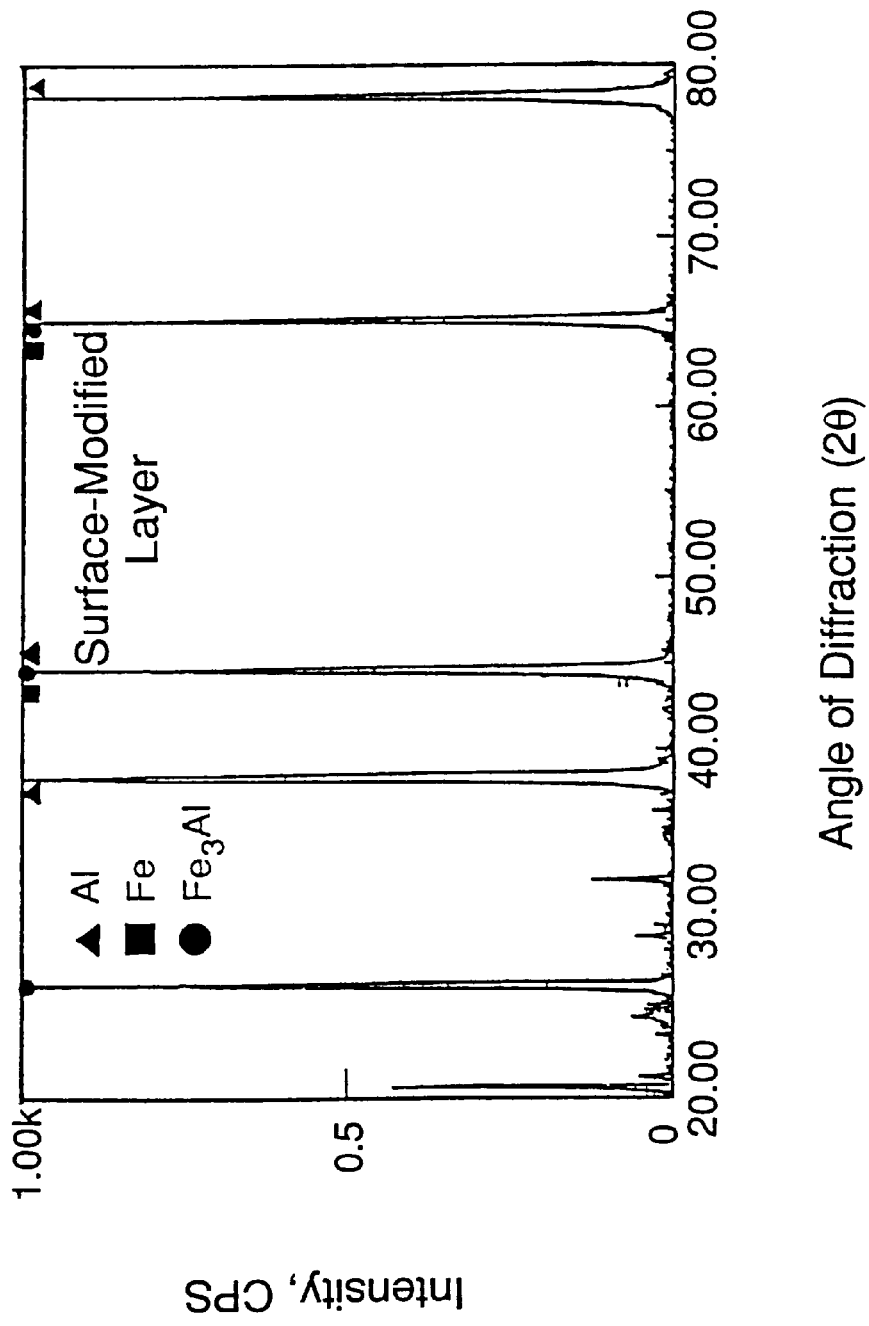

Evaluation of Samples:

EPMA analysis of the sample that had been surface-treated according to the method of the present invention verified that an Fe-rich layer having a depth of about 20 $\mu$m was formed in the surface area of the substrate. This sample was subjected to X-ray diffractometry, which gave the patterns of FIG. 2A to FIG. 2C. From these, the formation of compounds of Fe$_3$Al and others was confirmed in the alloy layer in addition to the component Al constituting the substrate. Precisely, FIG. 2A is a chart of the additive substance, Fe; FIG. 2B is a chart of the substrate, Al; and FIG. 2C is a chart of the surface-modified layer formed on the substrate.

Figure 3:
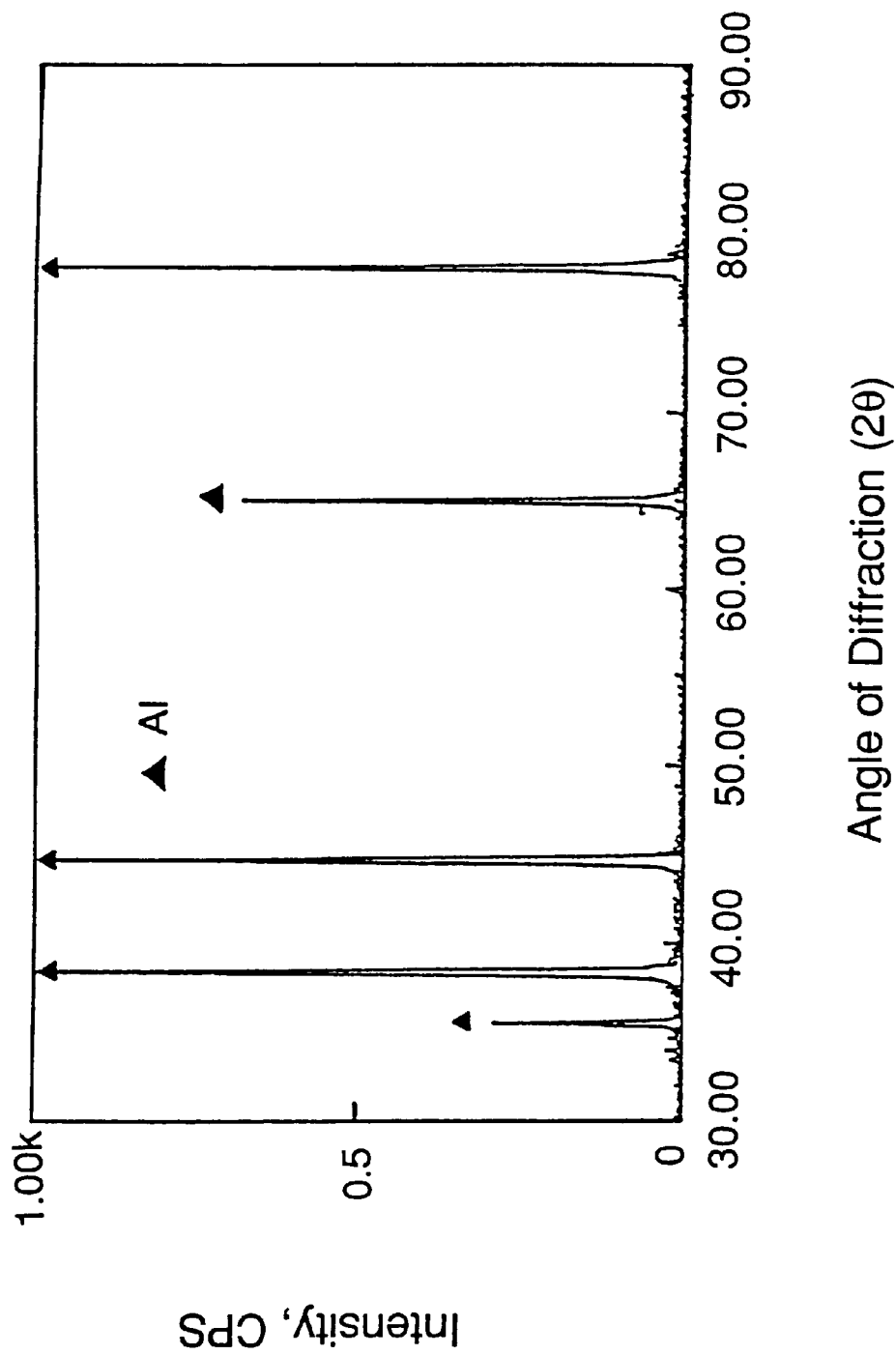
FIG. 3 is a chart in X-ray diffractometry of the comparative metallic part obtained in Comparative Example 1.
Figure 4:
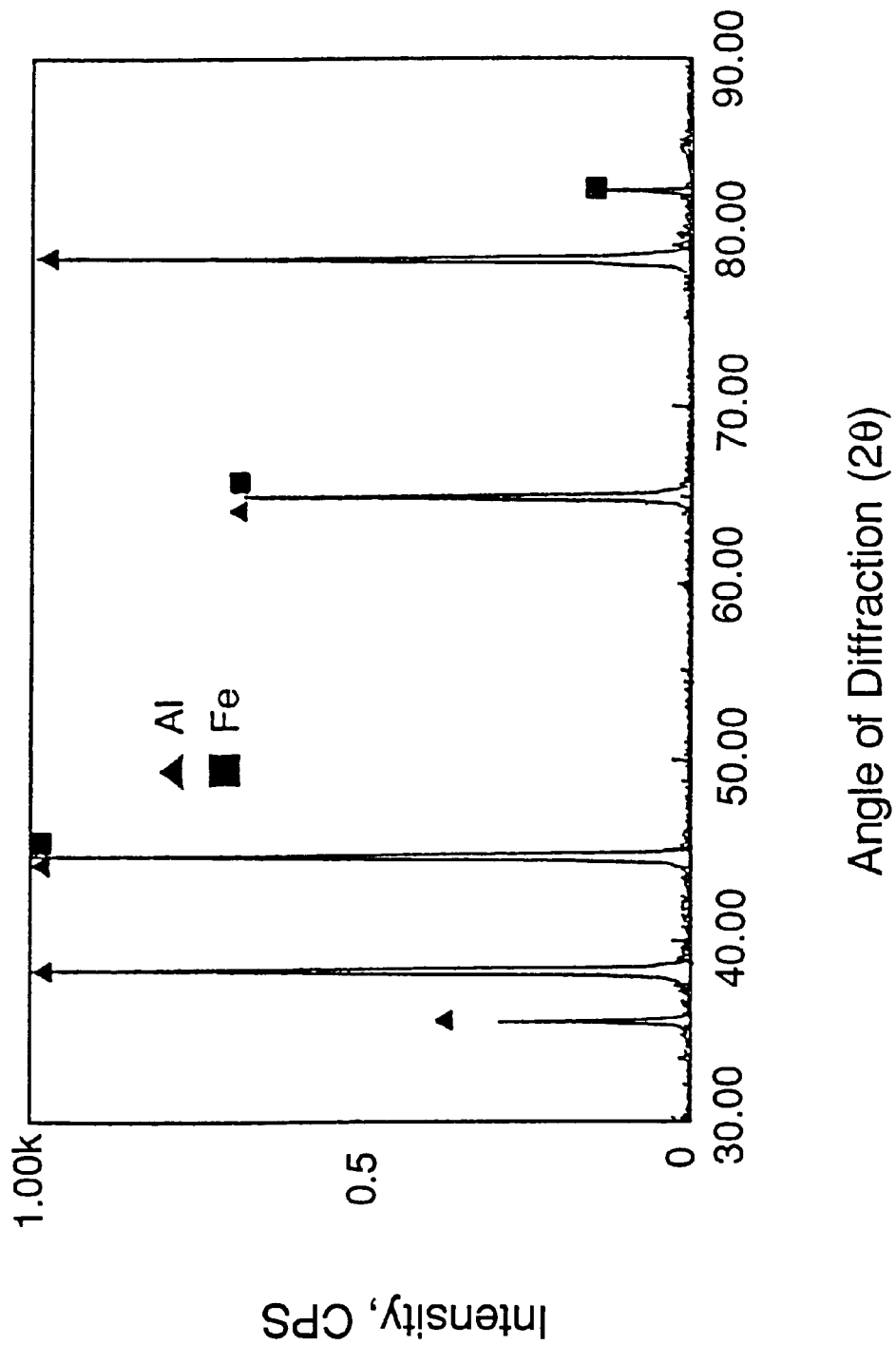
FIG. 4 is a chart in X-ray diffractometry of the comparative metallic part obtained in Comparative Example 2.

On the other hand, in the X-ray diffraction pattern of Sample C1 as produced in Comparative Example 1 under the condition to give residual stress to the sample, which is in FIG. 3, seen are only the peaks for the component Al constituting the substrate. In the X-ray diffraction pattern of Sample C2 as produced in Comparative Example 2 under the condition to mechanically embed the particles into the substrate, which is in FIG. 4, seen are only the peaks for the component Al constituting the substrate and those for the additive component Fe. Thus, in Sample C2, the presence of Fe particles in the substrate was confirmed. In these Samples C1 and C2, no new phase was formed.

From these results, it is understood that, in the surface treatment method of the present invention, Fe particles of the additive substance collided against the surface of the substrate to give local shearing stress to the substrate Al, whereby both the substrate Al and the additive substance Fe were deformed while a part of the additive substance Fe was mixed with the substrate. The repeated impartation of the mechanical energy to the substrate promoted the deformation of the substrate Al and the additive substance Fe, while Al and Fe were repeatedly rubbed together and contacted with each other under pressure whereby the atomic level reaction between Al and Fe was promoted. In this process, in addition, Al and Fe were satisfactorily stirred and mixed to such a degree that they could be reacted with each other in a solid phase to produce a new phase.

Accordingly, it is understood that the energy level in the prior art technique of imparting residual strain to the surface of the substrate or mechanically embedding particles into the substrate could not produce the mechanical alloying of the substrate.

EXAMPLE 2

This is to demonstrate the formation of a layer of a dispersion of Al—Fe compounds in the surface of an Al—Si—Cu-based alloy substrate in accordance with the surface treatment method of the present invention in order to improve the surface hardness of the substrate. To apply mechanical energy to the substrate, employed herein was a shot-peening method which is the same as that in Example 1. In this, however, shot-peening particles of steel having a particle size of about 400 $\mu$m were used, and pure iron particles having a particle size of approximately from 20 to 80 $\mu$m were used as the additive substance to form the compound layer. The shot-peening particles were jetted out at a jetting pressure of 6 kgf/cm$^2$ for 5 minutes to effect the reaction between the alloy substrate and the additive substance.

Figure 5:
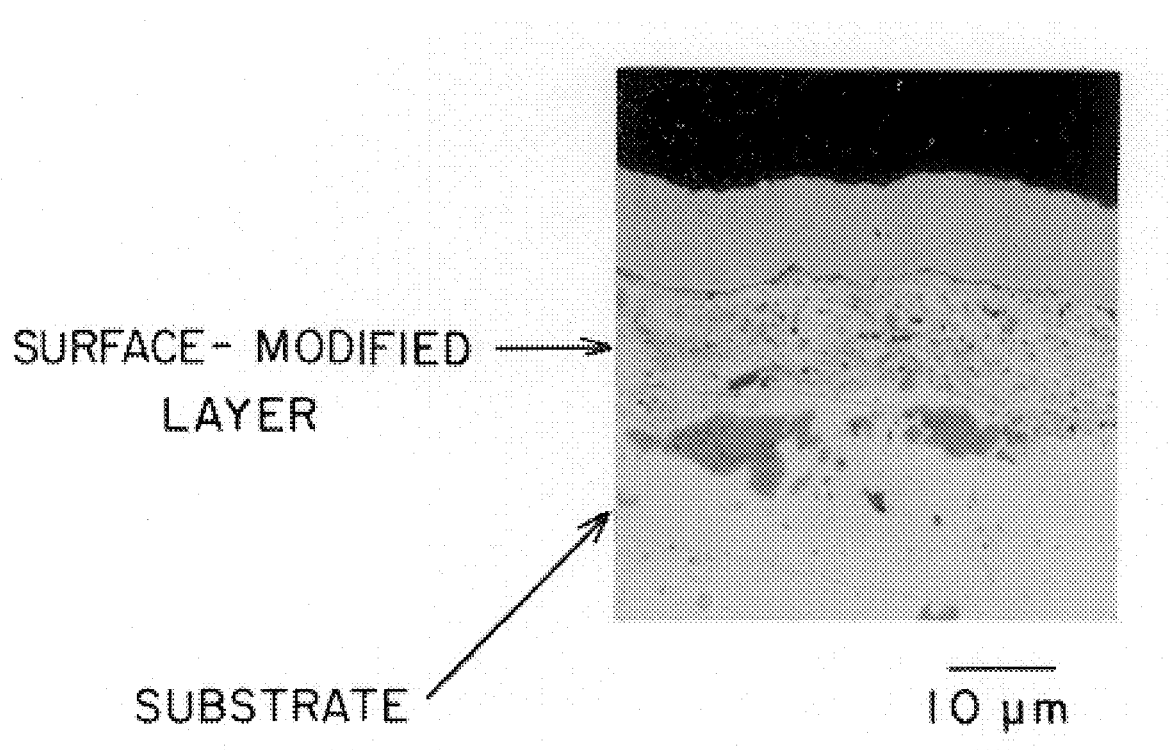
FIG. 5 is a photographic picture of the cross section of the surface-modified layer of the metallic part produced in Example 2, as taken with an optical microscope (×1000). This shows the metallic texture of the surface-modified layer.

The photographic picture of the cross section of the surface-modified layer part of the thus-treated alloy sample, which was taken with an optical microscope (×1000) and shows the metallic texture of the surface-modified layer, is in FIG. 5. This verified the formation of an alloy layer having a depth of about 15 $\mu$m in the surface area of the substrate.

Figure 6:
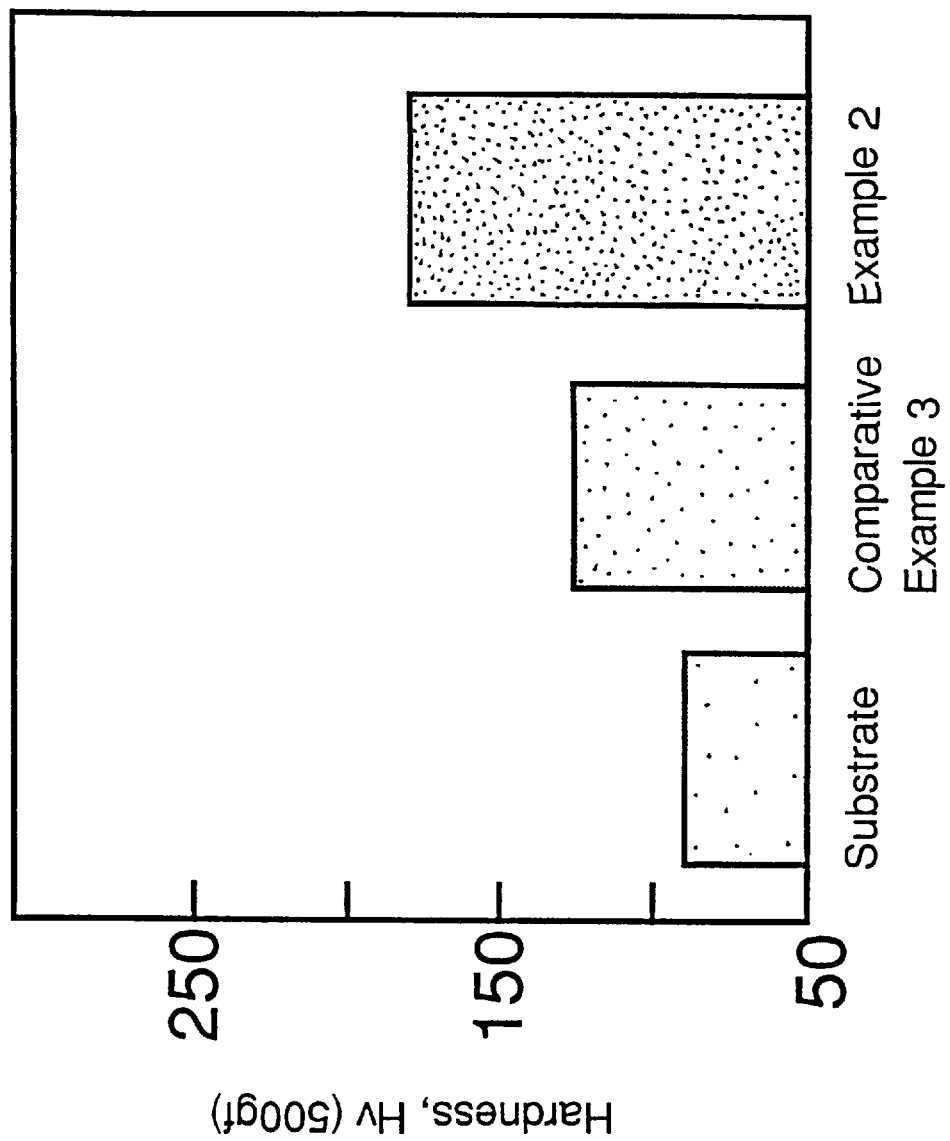
FIG. 6 is a graph showing the results of the performance evaluation test for the hardness of the surface-modified layer of the metallic part obtained in Example 2 and that of the comparative metallic part obtained in Comparative Example 3.

Next, the hardness of the surface-modified layer comprising a dispersion of AlFe compounds as formed in the surface area of the Al—Si—Cu-based alloy substrate was measured. The data obtained is shown in FIG. 6. The surface hardness of the non-treated Al—Si—Cu-based alloy is HV 85.

COMPARATIVE EXAMPLE 3

For comparison, the same Al—Si—Cu-based alloy as in Example 2 was shot-peened with steel particles having a particle size of 400 $\mu$m at an arc height amount of 0.4 mmA, and the surface hardness of the thus-treated sample was measured in the same manner as in Example 2.
Evaluation of Samples:

The hardness of the surface-modified layer of the metallic part as treated according to the method of the present invention in Example 2 was HV 170, which is about two times the hardness of the substrate matrix. However, the surface hardness of the comparative sample obtained in Comparative Example 3 was HV 120.

EXAMPLE 3

Titanium sponge having a purity of 99.9% and aluminium having a purity of 99.99% were weighed to give the intended alloy composition. These were put into a mold and induction-melted in an Ar atmosphere at a reduced pressure of 10$^{-4}$ Torr to obtain an ingot (Ti-47 at. % Al) of about 1 kg.

Next, this ingot was cut into test pieces of 10 mm×15 mm×3 mm, and the surface of each test piece was polished with #1500 SiC paper and then degreased with acetone.

The thus-prepared test pieces were surface-treated in shot-peening device, in which particles of SiO$_2$, Cr$_2$O$_3$, MoO$_3$, Nb$_2$O$_5$, Ta$_2$O$_5$ or WO$_3$ having a particle size of from 5 to 100 $\mu$m were repeatedly dashed against the test piece in an air atmosphere. The particles-jetting pressure was 4 kgf/cm$^2$.

The tabular test pieces prepared herein were subjected to an oxidation test, from which the oxidation resistance of the test pieces was evaluated. The oxidation test was conducted, using a resistance heating furnace, in which the test pieces were heated in air at 900° C. for 200 hours. Each test piece was heated in the furnace while being put in an Al$_2$O$_3$ crucible, and the weight of all the heated residue including the peeled, oxidized scale was measured. From this was obtained the weight increase caused by the oxidation. Based on the weight increase, the oxidation resistance of each test piece was evaluated. The data are shown in Table 1.

TABLE 1

| Sample No. | | Additive Substance | Oxidation Test Weight Increase after Oxidation (mg/cm$^2$) |
|---|---|---|---|
| Samples of the Invention | 1 | SiO$_2$ | 2.0 |
| | 2 | Cr$_2$O$_3$ | 1.1 |
| | 3 | MoO$_3$ | 1.4 |
| | 4 | Nb$_2$O$_5$ | 0.9 |
| | 5 | Ta$_2$O$_5$ | 1.2 |
| | 6 | WO$_3$ | 0.7 |
| Comparative Sample | C1 | None | 33.8 |

EXAMPLE 4

This is to demonstrate the influence of the Al content of TiAl-based alloys on the alloys. In this, three TiAl-based alloys each having a different Al content of 15 at. %, 47 at. % or 55 at. % were separately induction-melted in an Ar atmosphere to give ingots each weighing 1 kg. These ingots were cut into test pieces of 10 mm×15 mm×3 mm.

The thus-prepared test pieces were surface-treated in the same manner as in Example 3, using particles of SiO$_2$, Cr$_2$O$_3$, MoO$_3$, Nb$_2$O$_5$, Ta$_2$O$_5$ or WO$_3$ having a particle size of from 5 to 100 $\mu$m, and the thus-treated samples were subjected to the same oxidation test as in Example 3. The data obtained are shown in Table 2, from which it is understood that the TiAl-based alloy samples having an Al content of 15 at. %, 47 at. % or 55 at. % were effectively surface-treated according to the method of the invention.

TABLE 2

| Sample No. | | Substrate | Additive Substance | Oxidation Test Weight Increase after Oxidation (mg/cm$^2$) |
|---|---|---|---|---|
| Samples of the Invention | 7 | Ti-15Al | SiO$_2$ | 15.1 |
| | 8 | Ti-47Al | SiO$_2$ | 2.0 |
| | 9 | Ti-55Al | SiO$_2$ | 1.8 |
| | 10 | Ti-15Al | Cr$_2$O$_3$ | 10.5 |
| | 11 | Ti-47Al | Cr$_2$O$_3$ | 1.1 |
| | 12 | Ti-55Al | Cr$_2$O$_3$ | 0.9 |
| | 13 | Ti-15Al | MoO$_3$ | 12.3 |
| | 14 | Ti-47Al | MoO$_3$ | 1.4 |
| | 15 | Ti-55Al | MoO$_3$ | 1.0 |
| | 16 | Ti-15Al | Nb$_2$O$_5$ | 8.6 |
| | 17 | Ti-47Al | Nb$_2$O$_5$ | 0.9 |
| | 18 | Ti-55Al | Nb$_2$O$_5$ | 0.7 |
| | 19 | Ti-15Al | Ta$_2$O$_5$ | 9.7 |
| | 20 | Ti-47Al | Ta$_2$O$_5$ | 1.2 |
| | 21 | Ti-55Al | Ta$_2$O$_5$ | 1.0 |

TABLE 2-continued

| Sample No. | | Substrate | Additive Substance | Oxidation Test Weight Increase after Oxidation (mg/cm$^2$) |
|---|---|---|---|---|
| | 22 | Ti-15Al | WO$_3$ | 5.4 |
| | 23 | Ti-47Al | WO$_3$ | 0.7 |
| | 24 | Ti-55Al | WO$_3$ | 0.4 |
| Comparative | C2 | Ti-15Al | None | 105.6 |
| Samples | C3 | Ti-47Al | None | 33.8 |
| | C4 | Ti-55Al | None | 28.9 |

EXAMPLE 5

This Example is to demonstrate the surface treatment of Ti-47 at. % Al samples containing V, Cr, Nb, Mo, Ta or W. In the same manner as in Example 4, samples were prepared by induction-melting raw materials in Ar. These samples were surface-treated, using particles of WO$_3$, also in the same manner as in Example 4. The thus-treated samples were subjected to the same oxidation test as in Example 4. The data obtained are shown in Table 3.

TABLE 3

| Sample No. | | Substrate | Additive Substance | Oxidation Test Weight Increase after Oxidation (mg/cm$^2$) |
|---|---|---|---|---|
| Samples | 25 | Ti-47.1Al-1.6V | WO$_3$ | 0.8 |
| of the | 26 | Ti-47.3Al-1.5Cr | WO$_3$ | 0.7 |
| Invention | 27 | Ti-47.3Al-2.3Nb | WO$_3$ | 0.4 |
| | 28 | Ti-47.3Al-2.2Mo | WO$_3$ | 0.5 |
| | 29 | Ti-47.3Al-2.1Ta | WO$_3$ | 0.5 |
| | 30 | Ti-47.3Al-2.2W | WO$_3$ | 0.4 |
| Compara- | C5 | Ti-47.2Al-1.6V | None | 45.7 |
| tive | C6 | Ti-47.0Al-1.5Cr | None | 43.2 |
| Samples | C7 | Ti-47.1Al-2.0Nb | None | 2.4 |
| | C8 | Ti-47.4Al-2.1Mo | None | 3.7 |
| | C9 | Ti-47.1Al-1.6Ta | None | 3.6 |
| | C10 | Ti-48.1Al-2.0W | None | 3.9 |

In general, the oxidation resistance of alloys containing V or Cr is poorer than that of alloys not containing the element. As in Table 3, however, it is understood that the surface treatment of the present invention is effective even for the alloys containing the element.

In addition, it is also understood that the surface treatment of the present invention is effective even for the alloys containing Nb, Mo, Ta or W.

EXAMPLE 6

Boron was added to the alloy samples of Example 5 to prepare B-containing Ti-47 at. % Al samples, which were tested herein. Briefly, in the same manner as in Example 5, test samples were prepared by induction-melting raw materials in Ar, and then surface-treated. The thus-treated samples were subjected to the oxidation test also in the same manner as in Example 5. The data obtained are shown in Table 4.

TABLE 4

| Sample No. | | Substrate | Additive Substance | Oxidation Test Weight Increase after Oxidation (mg/cm$^2$) |
|---|---|---|---|---|
| Samples | 31 | Ti-47.1Al-1.6V-2.3B | WO$_3$ | 0.7 |
| of the | 32 | Ti-47.3Al-1.5Cr-2.2B | WO$_3$ | 0.8 |
| Inven- | 33 | Ti-47.3Al-2.3Nb-1.9B | WO$_3$ | 0.4 |
| tion | 34 | Ti-47.3Al-2.2Mo-1.7B | WO$_3$ | 0.5 |
| | 35 | Ti-47.3Al-2.1Ta-1.9B | WO$_3$ | 0.5 |
| | 36 | Ti-47.3Al-2.2W-2.2B | WO$_3$ | 0.4 |
| Com- | C11 | Ti-47.2Al-1.6V-2.2B | None | 42.7 |
| para- | C12 | Ti-47.0Al-1.5Cr-2.1B | None | 40.4 |
| tive | C13 | Ti-47.1Al-2.0Nb-2.1B | None | 2.5 |
| Samples | C14 | Ti-47.3Al-2.2Mo-1.9B | None | 3.6 |
| | C15 | Ti-47.1Al-1.6Ta-1.9B | None | 3.2 |
| | C16 | Ti-48.1Al-2.2W-2.1B | None | 3.5 |

In general, the oxidation resistance of alloys containing B is poorer than that of alloys not containing the element. As in Table 4, however, it is understood that the surface treatment of the present invention is effective even for the alloys containing the element B.

While the invention has been described in detail and with reference to specific embodiments thereof, it will be apparent to one skilled in the art that various changes and modifications can be made therein without departing from the spirit and scope thereof.

What is claimed is:

1. A method for surface-treatment of a metallic part, said method comprising:

applying mechanical energy to the surface of the metallic part and to a substance on or near the surface of the part to form a mechanically alloyed layer consisting essentially of at least one of a supersaturated solid solution, an amorphous phase or an oxide structure by promoting mixing of the metallic part and the substance on an atomic level thereby causing reaction between the substance and the surface of the metallic part, the substance being different from the metallic part in composition.

2. The method as claimed in claim 1, wherein the metallic part is of at least one light metal material selected from the group consisting of Al alloys, Mg alloys, Zn alloys and Ti alloys.

3. The method as claimed in claim 1, wherein the applying step is carried out at a temperature not higher than the recrystallization temperature of the metallic part to cause plastic deformation in the surface.

4. The method as claimed in claim 1, wherein the applying step is carried out at a temperature range between room temperature and the recrystallization temperature of the metallic part.

5. The method as claimed in claim 1, wherein the substance is in the form of particles not larger than 300 μm in size or in the form of a film not thicker than 10 μm.

6. The method as claimed in claim 1, wherein the applying step is carried out in a manner such that the mechanical energy is evenly applied to the entire surface of the metallic part at a shearing stress higher by at least 50% than the 0.2% yield point of the metallic part, to the minimum unit area per one cycle of not larger than 0.5 mm$^2$, and by repetition of not smaller than 50 cycles.

7. The method as claimed in claim 1, wherein the applying step is carried out by the repetition of high-speed collision of particles of the substance with the surface of the metallic part.

8. A method for surface-treatment of a TiAl-based alloy substrate, said method comprising:

applying mechanical energy to the surface of the TiAl-based alloy substrate and to a substance on or near the surface to form a mechanically-alloyed layer consisting essentially of an oxide having excellent oxidation resistance on the surface, the substrate comprising a TiAl-based alloy with an Al content of from 15–55 at. %, and the substance comprising an oxide or an oxidizable material having a smaller absolute value of standard free energy of formation than that of alumina.

9. The method as claimed in claim 8, wherein the substance comprises at least one element selected from the group consisting of silicon (Si), niobium (Nb), tantalum (Ta), chromium (Cr), molybdenum (Mo) and tungsten (W), and the layer is an alloyed layer consisting essentially of oxides of the substance.

10. The method as claimed in claim 8, wherein the substance comprises an oxide of at least one element selected from the group consisting of silicon (Si), niobium (Nb), tantalum (Ta), chromium (Cr), molybdenum (Mo) and tungsten (W), and the layer is an oxide layer of the element.

11. The method as claimed in claim 8, wherein the layer comprises an oxide that is stable in high-temperature oxidizing atmosphere to impart excellent oxidation resistance at high temperatures to the surface.

12. The method as claimed in claim 8, wherein the substrate further comprises at least one element selected from the group consisting of vanadium, niobium, tantalum, chromium, molybdenum and tungsten in a total amount from 0.1–10 at. % with respect to the whole substrate.

13. The method as claimed in claim 12, wherein the substrate further comprises boron in the amount from 1 at. % to 10 at. % with respect to the whole substrate.

14. The method as claimed in claim 8, wherein the substance comprises at least one element selected from the group consisting of niobium (Nb) and tantalum (Ta), and the layer is an oxide layer having excellent oxidation resistance at high temperature of the element of the substance, and forming a stable oxide layer of Al and O between the substrate and the oxide layer in a high-temperature oxidizing atmosphere.

15. The method as claimed in claim 8, wherein the substance comprises a chromium (Cr) element, the layer is an oxide layer of the element of the substance, and the oxide layer comprises a stable oxide layer having excellent oxidation resistance in high-temperature atmospheres.

16. The method as claimed in claim 8, wherein the substance is a material containing an oxide or an oxidizable material having a smaller absolute value of standard free energy of formation than that of alumina.

17. A method for surface-treatment of a metal part, comprising:

subjecting the surface of a metal part to repeated shear stress, which is higher than the 0.2% yield point of the metal part by at least 50%, by forceful mechanical application of an alloying substance to the metal part, thereby forming a mechanically alloyed layer consisting essentially of at least one of a supersaturated solid solution, an amorphous phase or an oxide structure, by mixing and reacting, on the atomic level, atoms of the metal part and atoms of the alloying substance.

* * * * *